(12) United States Patent
Onaka et al.

(10) Patent No.: US 10,240,837 B2
(45) Date of Patent: Mar. 26, 2019

(54) OUTDOOR UNIT AND REFRIGERATION CYCLE APPARATUS

(71) Applicant: Mitsubishi Electric Corporation, Chiyoda-ku (JP)

(72) Inventors: Yoji Onaka, Chiyoda-ku (JP); Takashi Matsumoto, Chiyoda-ku (JP); Mizuo Sakai, Chiyoda-ku (JP); Hiroki Murakami, Chiyoda-ku (JP); Hiroaki Nakamune, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 156 days.

(21) Appl. No.: 15/324,577

(22) PCT Filed: Jul. 15, 2015

(86) PCT No.: PCT/JP2015/070305
§ 371 (c)(1),
(2) Date: Jan. 6, 2017

(87) PCT Pub. No.: WO2016/017430
PCT Pub. Date: Feb. 4, 2016

(65) Prior Publication Data
US 2017/0205128 A1     Jul. 20, 2017

(30) Foreign Application Priority Data

Jul. 30, 2014   (JP) ................... 2014-155208

(51) Int. Cl.
*F25B 49/02* (2006.01)
*F25B 31/00* (2006.01)
*F25B 40/00* (2006.01)

(52) U.S. Cl.
CPC ............ *F25B 49/02* (2013.01); *F25B 31/008* (2013.01); *F25B 40/00* (2013.01);
(Continued)

(58) Field of Classification Search
CPC ........ F25B 49/02; F25B 40/00; F25B 31/008; F25B 2700/171; F25B 2600/0253;
(Continued)

(56) References Cited

U.S. PATENT DOCUMENTS

| 6,385,980 B1 | 5/2002 | Sienel |
| 2008/0104975 A1* | 5/2008 | Gorbounov ........... F25B 41/043 62/117 |
| 2010/0115975 A1* | 5/2010 | Mitra ......................... F25B 1/10 62/196.1 |
| 2011/0030407 A1* | 2/2011 | Yoshimi .................. F25B 9/008 62/324.5 |

(Continued)

FOREIGN PATENT DOCUMENTS

| EP | 1 207 359 A2 | 5/2002 |
| JP | H04121536 A * | 4/1992 |

(Continued)

OTHER PUBLICATIONS

Komeno et al., Heat Transfer Device, Apr. 22, 1992, JPH04121536A, Whole Document.*

(Continued)

*Primary Examiner* — Larry L Furdge
(74) *Attorney, Agent, or Firm* — Oblon, McClelland, Maier & Neustadt, L.L.P.

(57) ABSTRACT

An outdoor unit includes at least a compressor, a gas-liquid separator, and an outdoor heat exchanger of a refrigerant circuit, the refrigerant circuit being formed by connecting, by pipes, the compressor, a condenser, a pressure reducing device, the gas-liquid separator, and the outdoor heat exchanger that acts as an evaporator including at least a plurality of heat transfer tubes and an inlet header that distributes incoming refrigerant to the heat transfer tubes. The outdoor unit further includes a gas-liquid-separator bypass pipe, a gas-liquid-separator-side flow control valve, a header bypass pipe, a header-side flow control valve, and a determination device.

13 Claims, 19 Drawing Sheets

(52) U.S. Cl.
CPC ... *F25B 2400/0409* (2013.01); *F25B 2400/23* (2013.01); *F25B 2600/0253* (2013.01); *F25B 2600/2501* (2013.01); *F25B 2600/2509* (2013.01); *F25B 2700/171* (2013.01); *F25B 2700/2103* (2013.01); *F25B 2700/2117* (2013.01); *Y02B 30/741* (2013.01)

(58) Field of Classification Search
CPC .......... F25B 2600/2509; F25B 2400/23; F25B 2400/0409; F25B 2700/2117; F25B 2700/2103; F25B 2600/2501
See application file for complete search history.

(56) References Cited

U.S. PATENT DOCUMENTS

| | | |
|---|---|---|
| 2012/0192579 A1 | 8/2012 | Huff et al. |
| 2012/0227427 A1 | 9/2012 | Liu et al. |

FOREIGN PATENT DOCUMENTS

| | | |
|---|---|---|
| JP | 5-203266 A | 8/1993 |
| JP | 8-75311 A | 3/1996 |
| JP | 2000-55482 A | 2/2000 |
| JP | 2002-206890 A | 7/2002 |
| JP | 2008-133994 A | 6/2008 |
| JP | 2008-528939 A | 7/2008 |
| JP | 2010-255966 A | 11/2010 |
| WO | WO 2011/049767 A2 | 4/2011 |
| WO | WO 2011/049778 A1 | 4/2011 |

OTHER PUBLICATIONS

Extended European Search Report dated Jan. 29, 2018 in European Patent Application No. 15827526.3 citing documents AA-AC and AO-AQ therein, 8 pages.

Office Action dated Jan. 9, 2018 in Japanese Patent Application No. 2016-538262 (with English language translation).

International Search Report dated Sep. 29, 2015, in PCT/JP2015/070305 filed Jul. 15, 2015.

Office Action dated Jun. 20, 2017 in Japanese Patent Application No. 2016-538262 (with English language translation).

Combined Office Action and Search Report dated Aug. 1, 2018 in Chinese Patent Application No. 201580041778.X, (with English translation of Office Acton and English translation of categories of cited documents), 16 pages.

\* cited by examiner

OUTDOOR UNIT AND REFRIGERATION CYCLE APPARATUS

TECHNICAL FIELD

The present invention relates to an outdoor unit, for example. In particular, the present invention relates to distribution of refrigerant to heat transfer tubes included in an outdoor heat exchanger.

BACKGROUND ART

For example, a refrigeration cycle apparatus that uses a refrigeration cycle basically includes a compressor, a condenser, an expansion valve (pressure reducing device), and an evaporator that are connected by refrigerant pipes to form a refrigerant circuit through which refrigerant is circulated. In the refrigeration cycle apparatus, a refrigerant in liquid form (liquid refrigerant or refrigerant liquid) condensed in the condenser has its pressure reduced by the expansion valve, and thus turns into a refrigerant in a two-phase gas-liquid state containing both a refrigerant in gaseous form (gas refrigerant or refrigerant vapor) and a liquid refrigerant. The two-phase gas-liquid refrigerant then enters the evaporator. When refrigerant enters the evaporator in a two-phase gas-liquid state, for example, the resulting deterioration of distribution characteristics in the heat exchanger or other factors cause the energy efficiency of the refrigeration cycle apparatus to decrease.

An approach commonly employed in related art to address this problem is to improve distribution characteristics in the evaporator by adjusting the internal structure of a header that distributes refrigerant to heat transfer tubes or other components, such as by adjusting the amount of protrusion of branch pipes into the header or providing divider plates or ejection holes inside the header (see, for example, Patent Literature 1).

Further, an example of a method to change the state of refrigerant routed into the header involves using a float valve to cause refrigerant in a single, gaseous phase to be routed into the header for distribution, thus improving distribution characteristics (see, for example, Patent Literature 2).

CITATION LIST

Patent Literature

Patent Literature 1: Japanese Unexamined Patent Application Publication No. H05-203286 (FIG. 1)
Patent Literature 2: Japanese Unexamined Patent Application Publication (Translation of PCT Application) No. 2008-528939 (FIG. 1)

SUMMARY OF INVENTION

Technical Problem

However, adjusting the internal structure of the header as in Patent Literature 1 still leaves problems such as rather modest improvements in distribution characteristics and generation of large pressure loss at the refrigerant inlet of the heat exchanger. Further, if the structure of the header is adjusted for operating conditions at high refrigerant flow rates (large refrigerant quantities), distribution characteristics further deteriorate under operating conditions at low refrigerant flow rates.

An existing example of a method to improve distribution involves, as in Patent Literature 2, attaching a mechanism for releasing gas refrigerant to the gas-liquid separator, an upper part of the header, or other locations so that refrigerant in a single, gaseous phase is routed into the header of the heat exchanger to improve distribution. This method tends to be affected by refrigerant flow rate. For instance, although this method enables uniform distribution of refrigerant under conditions at high refrigerant flow rates, when the flow rate of refrigerant is low, liquid refrigerant may fail to flow to the upper part of the header, making it impossible to achieve uniform distribution.

Accordingly, it is an object of the present invention to provide, for example, an outdoor unit that allows for improved distribution irrespective of the operating condition.

Solution to Problem

An outdoor unit of an embodiment of the present invention is an outdoor unit for a refrigerant circuit. The refrigerant circuit is formed by connecting, by pipes, a compressor, a condenser that causes the refrigerant to reject heat to condense, a pressure reducing device that reduces a pressure of the refrigerant that is condensed, a gas-liquid separator, and an evaporator. The outdoor unit includes the compressor that compresses and discharges a refrigerant sucked into the compressor, the gas-liquid separator that separates the refrigerant exiting the pressure reducing device into refrigerant in gaseous form and refrigerant in liquid form, an outdoor heat exchanger serving as the evaporator including at least a plurality of heat transfer tubes that cause the refrigerant to receive heat to evaporate and an inlet header that distributes the refrigerant entering the inlet header to the plurality of heat transfer tubes, a gas-liquid-separator bypass pipe that causes the refrigerant in the gaseous form separated by the gas-liquid separator to bypass the evaporator, a gas-liquid-separator-side flow control device configured to control a flow rate of the refrigerant through the gas-liquid-separator bypass pipe, a header bypass pipe having one end connected to the inlet header at a header termination side located opposite to a refrigerant inlet side of the inlet header, the header bypass pipe sucking the refrigerant entering the inlet header, a header-side flow control device configured to control a flow rate of the refrigerant through the header bypass pipe, and a determination device configured to determine, from a frequency of the compressor, an opening degree of the gas-liquid-separator-side flow control device and an opening degree of the header-side flow control device.

Advantageous Effects of Invention

According to an embodiment of the present invention, the determination device determines the respective opening degrees of the gas-liquid-separator-side flow control device and the header-side flow control device from the frequency of the compressor, thus allowing for improved distribution of refrigerant under a wide range of operating conditions.

DESCRIPTION OF EMBODIMENTS

Figure 1:
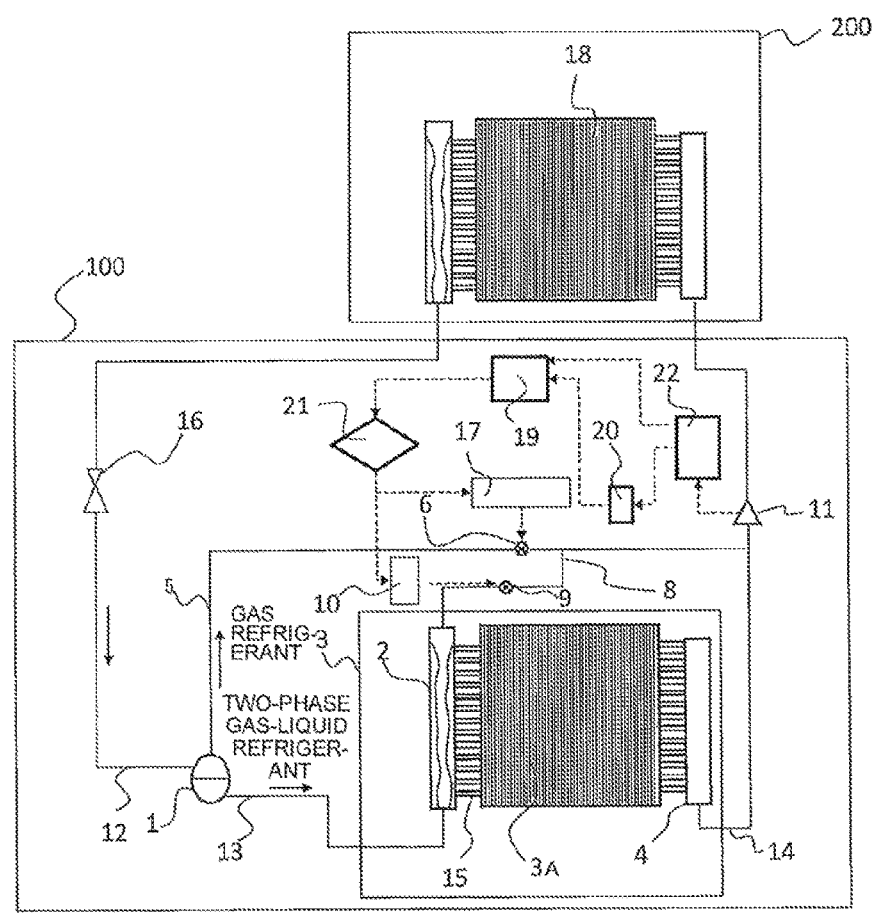
FIG. 1 illustrates the configuration of a refrigeration cycle apparatus according to Embodiment 1 of the present invention.

Hereinafter, embodiments of the present invention will be described with reference to the drawings. In the following drawings including FIG. 1, the same reference signs refer to identical or corresponding elements, and this applies throughout this specification. Further, the forms of various components given throughout this specification are for illustrative purposes only and are not intended to limit the invention to the particular forms disclosed. In particular, the combination of components is not limited to that exemplified in each of embodiments, and a component described in another embodiment may be applied to a different embodiment. An upper part in the drawings will be referred to as "upper" or "above", and a lower part in the drawings will be referred to as "lower" or "below". The relative sizes of various components are not necessarily to scale in the drawings.

Embodiment 1

FIG. 1 illustrates the configuration of refrigeration cycle apparatus according to Embodiment 1 of the present invention. Referring to FIG. 1, the refrigeration cycle apparatus according to Embodiment 1 includes an outdoor unit 100 and a load unit 200 that are connected by refrigerant pipes to form a refrigerant circuit, through which refrigerant is circulated. The outdoor unit 100 supplies capacity to the load unit 200 via refrigerant. The load unit 200 supplies heat to a target load.

The load unit 200 has a load heat exchanger 18. The load heat exchanger 18 acts as a condenser (radiator) to condense refrigerant and apply heat to the load. Although the load heat exchanger 18 acts as a condenser in Embodiment 1, if, for example, the refrigeration cycle apparatus is an air-conditioning apparatus, the load heat exchanger 18 also acts as an evaporator.

The outdoor unit 100 has a compressor 11, an outdoor heat exchanger 3, an expansion valve 16, a gas-liquid separator 1, a gas-liquid-separator bypass pipe 5, a gas-liquid-separator-side flow control valve 6, a header bypass pipe 8, and a header-side flow control valve 9. The compressor 11 compresses and discharges refrigerant sucked into the compressor 11. The compressor 11 may be configured such that the capacity (the amount of refrigerant delivered per unit time) of the compressor 11 can be varied by varying driving frequency in any given manner by, for example, an inverter circuit. The expansion valve 16, which acts as a pressure reducing device (expansion device), reduces the pressure of refrigerant to cause the refrigerant to expand. The gas-liquid refrigerant (including a two-phase gas-liquid refrigerant). The two-phase gas-liquid refrigerant flows through a two-phase refrigerant pipe 13.

The gas-liquid-separator bypass pipe 5 connects the gas outlet side of the gas-liquid separator 1 with a suction-side pipe 14 of the compressor 11. The gas-liquid-separator-side flow control valve 6, which acts as a gas-liquid-separator-side flow control device, controls the flow rate of refrigerant through the gas-liquid-separator bypass pipe 5 under control of a flow-control-valve-opening-degree controller 17. The header bypass pipe 8 connects an upper part of an inlet header 2 (its termination side located opposite to the refrigerant inlet side) with a suction-side pipe 14 of the compressor 11. The header-side flow control valve 9, which acts as a header-side flow control device, controls the flow rate of refrigerant through the header bypass pipe 8 under control of a flow-control-valve-opening-degree controller 10. Although the flow rate of refrigerant is controlled through control of valve opening degree by each of the gas-liquid-separator-side flow control valve 6 and the header-side flow control valve 9 in this example, the flow rate of refrigerant may be controlled by other devices.

A control board 22 controls the refrigeration cycle apparatus. In Embodiment 1, if, for example, the refrigeration cycle apparatus is an air-conditioning apparatus, the control board 22 transmits a signal including data of operation mode, such as cooling operation or heating operation, to a memory 19. The control board 22 also transmits, to a compressor frequency reader 20, a signal about frequency (driving frequency) transmitted from the compressor 11. The compressor frequency reader 20 reads the frequency of the compressor 11, and transmits a signal including compressor frequency data to the memory 19. The memory 19, which acts as a storage device, stores, for example, data required for a determination device 21 to make a determination, either temporarily or long term. For example, in Embodiment 1, the memory 19 stores operation mode data transmitted from the control board 22. The memory 19 also stores compressor frequency data included in a signal transmitted from the compressor frequency reader 20. The determination device 21 performs a determination process in the refrigeration cycle apparatus. In the present example, in particular, the determination device 21 performs a process for reading data stored in the memory 19 to control the gas-liquid-separator-side flow control valve 6 and the header-side flow control valve 9.

Figure 2:
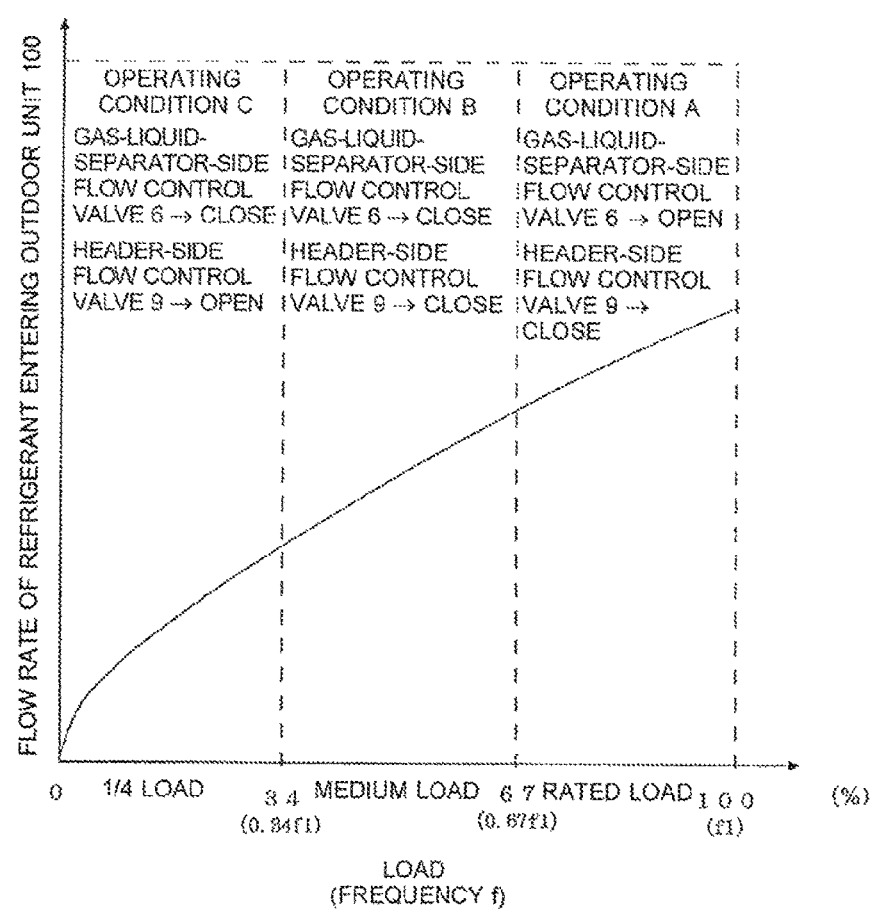
FIG. 2 concerns how a gas-liquid-separator-side flow control valve 6 and a header-side flow control valve 9 are controlled according to Embodiment 1 of the present invention.

FIG. 2 concerns how the gas-liquid-separator-side flow control valve 6 and the header-side flow control valve 9 are controlled according to Embodiment 1 of the present invention. In controlling the gas-liquid-separator-side flow control valve 6 and the header-side flow control valve 9, Embodiment 1 classifies the load of the refrigeration cycle apparatus into, for example, at least the three following categories: 67% or over up to 100% (rated load), 34% or over to under 66% (medium load), and 0% or over to under 33% (¼ load).

When the refrigeration cycle apparatus is operating at rated load, refrigerant flows into the outdoor unit 100 at a high rate. Under the operating condition at rated load (referred to as Operating Condition A), the gas-liquid-separator-side flow control valve 6 is controlled to open, and the header-side flow control valve 9 is controlled to close. When the refrigeration cycle apparatus is operating at medium load, refrigerant flows into the outdoor unit 100 at a rate lower than that at rated load. Under the operating condition at medium load (referred to as Operating Condition 8), the gas-liquid-separator-side flow control valve 6 and the header-side flow control valve 9 are controlled to close. When the refrigeration cycle apparatus is operating at ¼ load, refrigerant flows into the outdoor unit 100 at a rate further lower than that at medium load. Under the operating condition at ¼ load (referred to as Operating Condition C), the gas-liquid-separator-side flow control valve 6 is controlled to close, and the header-side flow control valve 9 is controlled to open.

Figure 3:
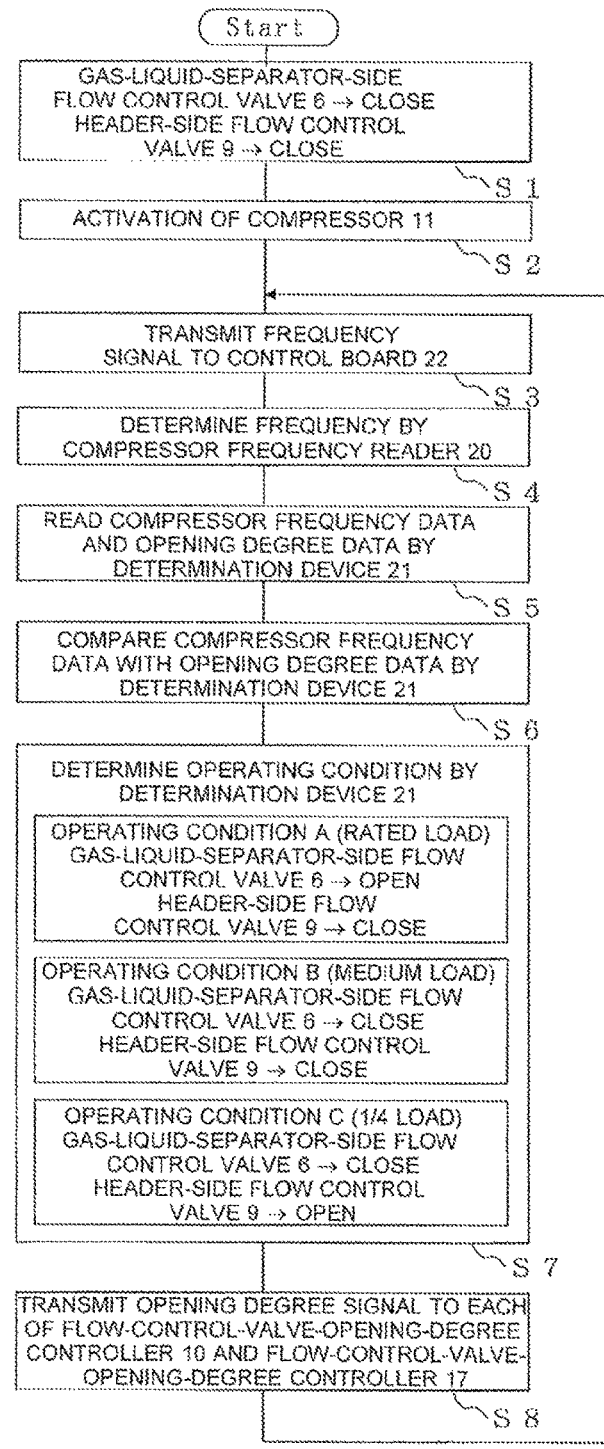
FIG. 3 is a flowchart illustrating how the gas-liquid-separator-side flow control valve 6 and the header-side flow control valve 9 are controlled according to Embodiment 1 of the present invention.

FIG. 3 is a flowchart illustrating how the gas-liquid-separator-side flow control valve 6 and the header-side flow control valve 9 are controlled according to Embodiment 1 of the present invention. The control of the gas-liquid-separator-side flow control valve 6 and the header-side flow control valve 9 will be described below with reference to FIG. 3. In this case, for example, the relationship between load and the frequency of the compressor 11 is determined in advance through an experiment, calculation, or other processes. For example, let f1 represent the compressor frequency at 100% load. Letting f be defined as the frequency of the compressor that is operating, for example, $0.67 \times f1 < f \leq f1$ is defined as the rated load. $0.34 \times f < f1 \leq 0.67$ is defined as the medium load. Further, $0 < f \leq 0.34 \times f1$ is defined as the ¼ load. The relationship between load and the opening degrees of the gas-liquid-separator-side flow control valve 6 and the header-side flow control valve 9, which is described above with reference to FIG. 2, is stored into the memory 19 in advance as opening degree data.

In the initial state, the gas-liquid-separator-side flow control valve 6 and the header-side flow control valve 9 are in a closed state (opening degree: zero) (S1). When the refrigeration cycle apparatus starts to operate, the compressor 11 is activated (S2). A frequency signal is transmitted from the compressor 11 to the control board 22 (S3). The compressor frequency reader 20 determines the frequency of the compressor 11 that is currently operating, and stores the compressor frequency data into the memory 19 (S4).

The determination device 21 reads the compressor frequency data and the opening degree data from the memory 19 (S5). Then, the determination device 21 compares the compressor frequency data with the opening degree data (S6). The determination device 21 determines whether the current operating condition is Operating Condition A (rated load), Operating Condition B (medium load), or Operating Condition C (¼ load) (S7). Then, the determination device 21 transmits an opening degree signal based on the determined operating condition to each of the flow-control-valve-opening-degree controller 10 and the flow-control-valve-opening-degree controller 17 (S8). The processing then returns to S2 to repeat the determination of operating condition based on the frequency of the compressor 11.

The flow-control-valve-opening-degree controller 10 and the flow-control-valve-opening-degree controller 17 respectively control the gas-liquid-separator-side flow control valve 6 and the header-side flow control valve 9 based on the received opening degree signals. When the opening degree is to be changed, a signal is transmitted to each of the gas-liquid-separator-side flow control valve 6 and the header-side flow control valve 9.

As described above, the gas-liquid-separator-side flow control valve 6 and the header-side flow control valve 9 are controlled based on the frequency of the compressor 11 to thereby reduce maldistribution of refrigerant flow to the heat transfer tubes 15 under a wide range of operating conditions. This configuration also makes it possible to adjust the quality of refrigerant entering the heat transfer tubes 15 of the outdoor heat exchanger 3.

In FIG. 1, the outdoor heat exchanger 3 according to Embodiment 1 acts as an evaporator to allow refrigerant to exchange heat with the outdoor air (outside air), causing the refrigerant to evaporate into a vapor (evaporate and gasify). Although the outdoor heat exchanger 3 acts as an evaporator in Embodiment 1, if, for example, the refrigeration cycle apparatus is an air-conditioning apparatus, the outdoor heat exchanger 3 acts also as a condenser. When the outdoor heat exchanger 3 acts as a condenser, the gas-liquid-separator-side flow control valve 6 and the header-side flow control valve 9 are controlled to fully close.

Figure 4:
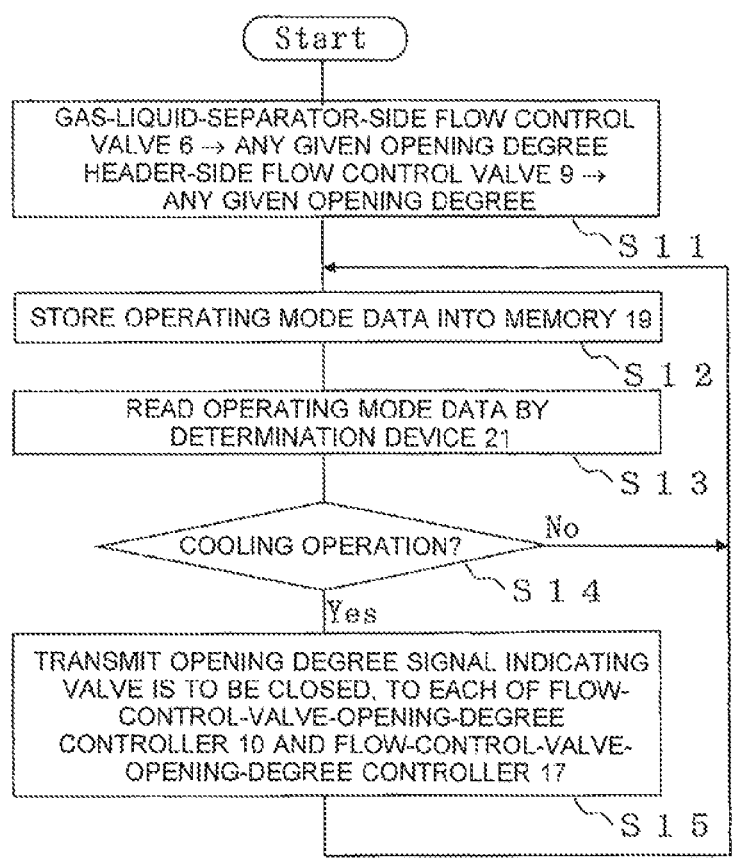
FIG. 4 is a flowchart illustrating how the gas-liquid-separator-side flow control valve 6 and the header-side flow control valve 9 are controlled according to Embodiment 1 of the present invention when an outdoor heat exchanger 3 acts as a condenser.

FIG. 4 is a flowchart illustrating how the gas-liquid-separator-side flow control valve 6 and the header-side flow control valve 9 are controlled according to Embodiment 1 of the present invention when the outdoor heat exchanger 3 acts as a condenser. For example, if the refrigeration cycle apparatus is an air-conditioning apparatus, the outdoor heat exchanger 3 acts as either a condenser or an evaporator. In this regard, the following description is directed to a case in which the outdoor heat exchanger 3 acts as a condenser to cool the load. In the initial state of the control, the gas-liquid-separator-side flow control valve 6 and the header-side flow control valve 9 are each set at any given opening degree (S11). The control board 22 transmits a signal indicating the operation being currently performed by the refrigeration cycle apparatus, and causes the memory 19 to store the signal as operation mode data (S12).

The determination device 21 reads the operation mode data (S13). Then, the determination device 21 determines whether cooling operation is to be performed by the refrigeration cycle apparatus (S14). When the determination device 21 determines that cooling operation is to be performed, the determination device 21 transmits, to each of the flow-control-valve-opening-degree controller 10 and the flow-control-valve-opening-degree controller 17, an opening degree signal indicating that the corresponding valve is to be closed (S15).

The flow-control-valve-opening-degree controller 10 and the flow-control-valve-opening-degree controller 17 respectively control, based on the received opening degree signals, the gas-liquid-separator-side flow control valve 6 and the header-side flow control valve 9 so that these valves are closed.

The outdoor heat exchanger 3 has the inlet header 2 the heat transfer tubes 15, a heat exchange unit 3A, which is made up of components such as fins, and an outlet header 4. In the heat exchange unit 3A, the refrigerant passing through the heat transfer tubes 15 exchanges heat with the outside air, causing the refrigerant to evaporate and gasify by receiving heat. The outlet header 4 is a pipe used to merge the streams of gas refrigerant exiting the heat transfer tubes 15 and cause the merged refrigerant to exit to the pipe located on the suction side of the compressor 11.

Figure 5:
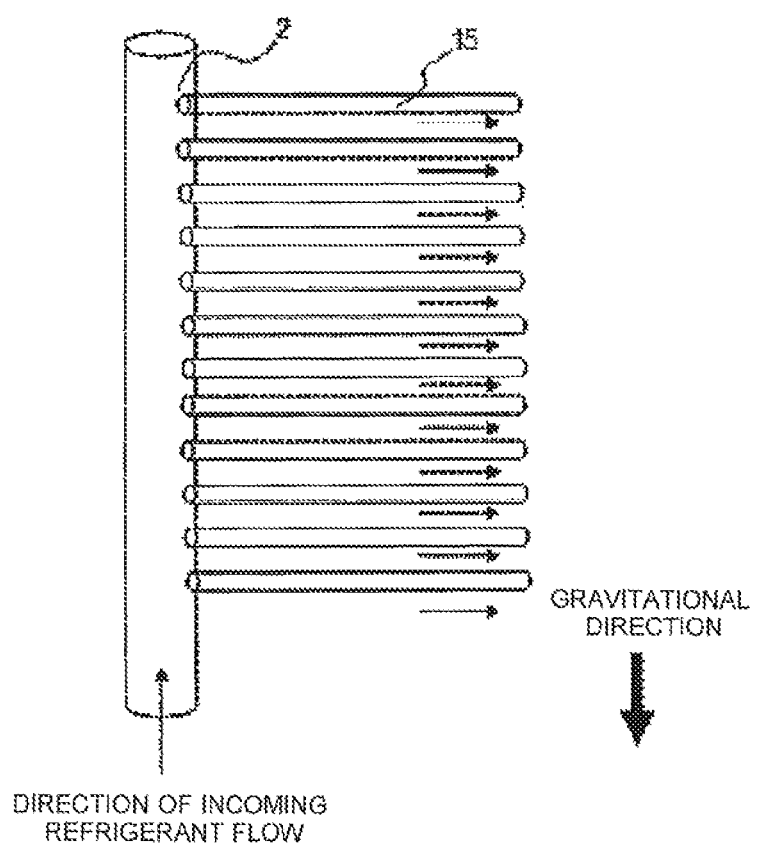
FIG. 5 illustrates the relationship between an inlet header 2 and heat transfer tubes 15 according to Embodiment 1 of the present invention.

FIG. 5 illustrates the relationship between the inlet header 2 and the heat transfer tubes 15 according to Embodiment 1 of the present invention. The inlet header 2 is a pipe that distributes incoming refrigerant to the heat transfer tubes 15. The outdoor heat exchanger 3 according to Embodiment 1 has a structure (perpendicular header) such that the two-phase gas-liquid refrigerant entering the inlet header 2 is distributed to the heat transfer tubes 15 connected in a direction perpendicular to the direction of passage of the refrigerant through the inlet header 2. In the outdoor unit 100, the outdoor heat exchanger 3 is placed such that the pipe forming the inlet header 2 extends vertically. Thus, as illustrated in FIG. 5, the two-phase gas-liquid refrigerant exiting the two-phase refrigerant pipe 13 enters the inlet header 2 from the refrigerant inlet located in a lower part of the inlet header 2. Then, as the refrigerant moves vertically upward within the inlet header 2 as an ascending flow, the refrigerant splits to flow into each of the heat transfer tubes 15. The refrigerant flows perpendicularly (horizontally) in each of the heat transfer tubes 15. Now, referring to FIG. 5 or other figures, the two-phase refrigerant pipe 13 and the inlet header 2 are connected to each other at the lowermost end portion of the inlet header 2 to allow entry of refrigerant. However, if the gas-liquid-separator bypass pipe 5 is located above the two-phase refrigerant pipe 13, the two-phase refrigerant pipe 13 and the inlet header 2 may be connected to each other at the lateral face of a lower part of the inlet header 2.

Embodiment 1 aims to achieve improved distribution of liquid refrigerant contained in a two-phase gas-liquid refrigerant in the inlet header 2 under a wide range of operating conditions. In this regard, the distribution of liquid refrigerant in the inlet header 2 exhibits different tendencies depending on the momentum of refrigerant (two-phase gas-liquid refrigerant) at the header's refrigerant inlet located at the refrigerant inlet side.

Figure 6:
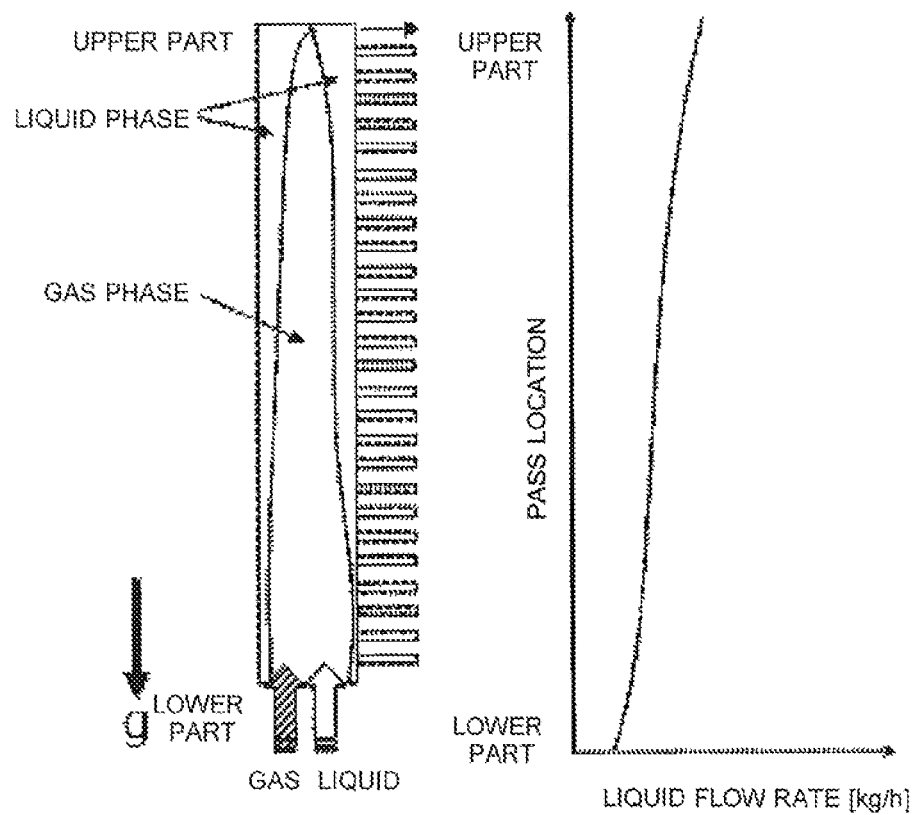
FIG. 6 illustrates the distribution characteristics of two-phase gas-liquid refrigerant in the inlet header 2 when the momentum at the header's refrigerant inlet is large.
Figure 7:
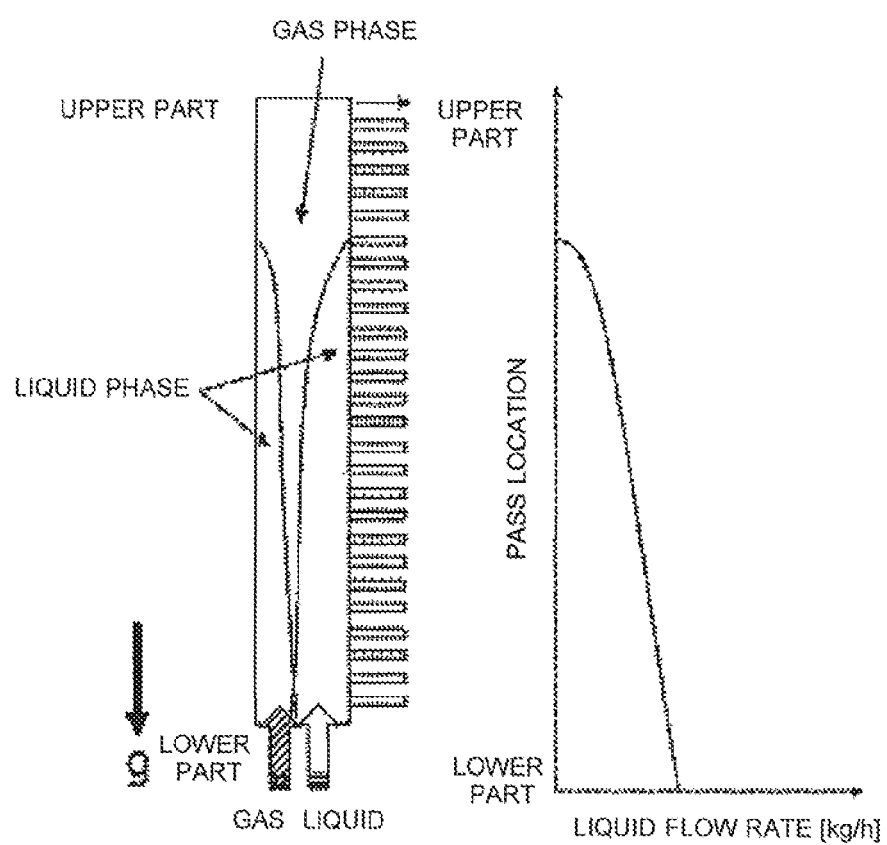
FIG. 7 illustrates the distribution characteristics of two-phase gas-liquid refrigerant in the inlet header 2 when the momentum at the header's refrigerant inlet is small.

FIG. 6 illustrates the distribution characteristics of two-phase gas-liquid refrigerant in the inlet header 2 when the momentum at the header's refrigerant inlet is large, FIG. 7 illustrates the distribution characteristics of two-phase gas-liquid refrigerant in the inlet header 2 when the momentum at the header's refrigerant inlet is small. The momentum increases with increase in refrigerant flow rate or with increase in the flow rate of gas present in the refrigerant, and decreases with decrease in refrigerant flow rate or with decrease in the flow rate of gas present in the refrigerant. Both FIG. 6 and FIG. 7 represent a case in which the ratio between gas refrigerant and liquid refrigerant is 2:8, with FIG. 6 representing when the refrigerant flow rate is comparatively high and FIG. 7 representing when the refrigerant flow rate is comparatively low. For example, when the refrigerant flow rate (gas flow rate) is high and the refrigerant has a large momentum, the force of refrigerant within the header is strong. The resulting distribution characteristics in this case are such that a large amount of liquid refrigerant is conveyed to the upper part of the header. By contrast, when the refrigerant flow rate (gas flow rate) is low and the refrigerant has a small momentum, the resulting distribution characteristics in this case are such that the liquid refrigerant is not conveyed to the upper part of the header, with a large amount of liquid refrigerant being conveyed to the lower part of the header.

Figure 8:
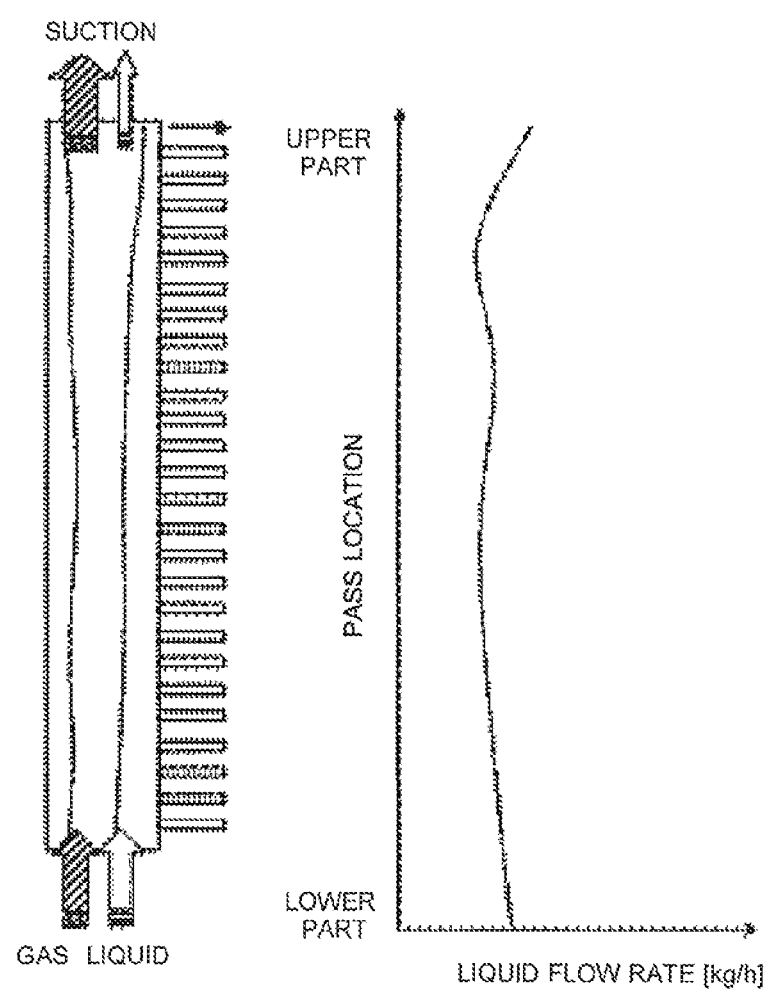
FIG. 8 illustrates the distribution characteristics of two-phase gas-liquid refrigerant in the inlet header 2 according to Embodiment 1 of the present invention.

FIG. 8 illustrates the distribution characteristics of two-phase gas-liquid refrigerant in the inlet header 2 according to Embodiment 1 of the present invention. In Embodiment 1, the gas-liquid separator 1, the gas-liquid-separator bypass pipe 5, the gas-liquid-separator-side flow control valve 6, the header bypass pipe 8, and the header-side flow control valve 9 are used to control the momentum of refrigerant in the inlet header 2.

For example, at large refrigerant momentum (rated load), a large amount of liquid refrigerant is conveyed to the upper part of the inlet header 2 as described above. In this case, the respective opening degrees of the header-side flow control valve 9 and the gas-liquid-separator-side flow control valve 6 are controlled such that the header-side flow control valve 9 is fully closed, and the gas-liquid-separator-side flow control valve 6 is opened. As part of the gas refrigerant separated by the gas-liquid separator 1 is thus bypassed to the suction-side pipe 14 of the compressor 11, the flow rate of gas refrigerant entering the inlet header 2 decreases. This makes it possible to reduce the momentum of the refrigerant flow within the inlet header 2. Under Operating Condition A, the gas-liquid-separator-side flow control valve 6 is opened to have its opening degree controlled to optimize momentum. This allows liquid refrigerant to be distributed in a relatively uniform manner as illustrated in FIG. 8.

The header diameter is designed in advance such that the momentum of refrigerant flow within the inlet header 2 becomes optimum when the refrigerant flow rate is lower than that at rated load and the momentum of refrigerant is at a medium level (at medium load) lower than that at rated load. Thus, under Operating Condition B, a relatively uniform distribution of liquid refrigerant can be obtained as illustrated in FIG. 8, with the gas-liquid-separator-side flow control valve 6 and the header-side flow control valve 9 being fully closed.

When the refrigerant has a small momentum (¼ load), under Operating Condition C, the gas-liquid-separator-side flow control valve 6 is fully closed so that the rate at which gas refrigerant flows into the inlet header 2 does not decrease. Further, the header-side flow control valve 9 is opened to generate, in the upper part of the header, a suction flow in which two-phase gas-liquid refrigerant flows. In addition, gravity causes liquid head differences to be produced on the inlet header 2. This causes gas refrigerant to more readily flow to the header bypass pipe 8 than liquid refrigerant. Therefore, the decrease in the amount of heat exchange due to passage of liquid refrigerant into the header bypass pipe 8 is small. By controlling values such as the opening degrees of the header bypass pipe 8 and the header-side flow control valve 9, and the flow resistance of the header bypass pipe 8 to produce an optimum suction flow, the liquid refrigerant can be distributed in a relatively uniform manner as illustrated in FIG. 8.

As for the target values of the opening degrees of the gas-liquid-separator-side flow control valve 6 and the header-side flow control valve 9 respectively controlled by the flow-control-valve-opening-degree controller 17 and the flow-control-valve-opening-degree controller 10, the relationship between refrigerant flow rate and the optimum gas flow rate for distribution is determined in advance as described above based on the results of an experiment conducted with the inlet header 2 alone, simulation, or other processes, and the relationship between compressor frequency and opening degree is determined from the above relationship and stored into the memory 19. In this way, for example, the gas-liquid-separator-side flow control valve 6 and the header-side flow control valve 9 are controlled in a manner operatively associated with the driving frequency of the compressor 11.

In Embodiment 1, the rate at which refrigerant flows through each of the gas-liquid-separator bypass pipe 5 and the header bypass pipe 8 is controlled by a flow control valve. However, this is not to be construed restrictively. For example, this can be substituted for by a combination of a capillary tube and a switch valve. In this case, cost can be reduced compared to when a flow control valve is used.

As described above, according to Embodiment 1, in situations such as when the momentum of refrigerant at the refrigerant inlet of the inlet header 2 is large, the gas-liquid-separator-side flow control valve 6 is opened to reduce, at the refrigerant inlet, the flow rate of the gas refrigerant present in the two-phase gas-liquid refrigerant, and in situations such as when the momentum of two-phase gas-liquid refrigerant is small, a suction flow is generated by means of the header-side flow control valve 9 so that the liquid refrigerant is raised to the upper part of the header to flow into the header bypass pipe 8 connected to the termination portion of the inlet header 2. This configuration allows for improved distribution in the inlet header 2 under a wide range of operating conditions from low refrigerant flow rates to high refrigerant flow rates.

Embodiment 2

Figure 9:
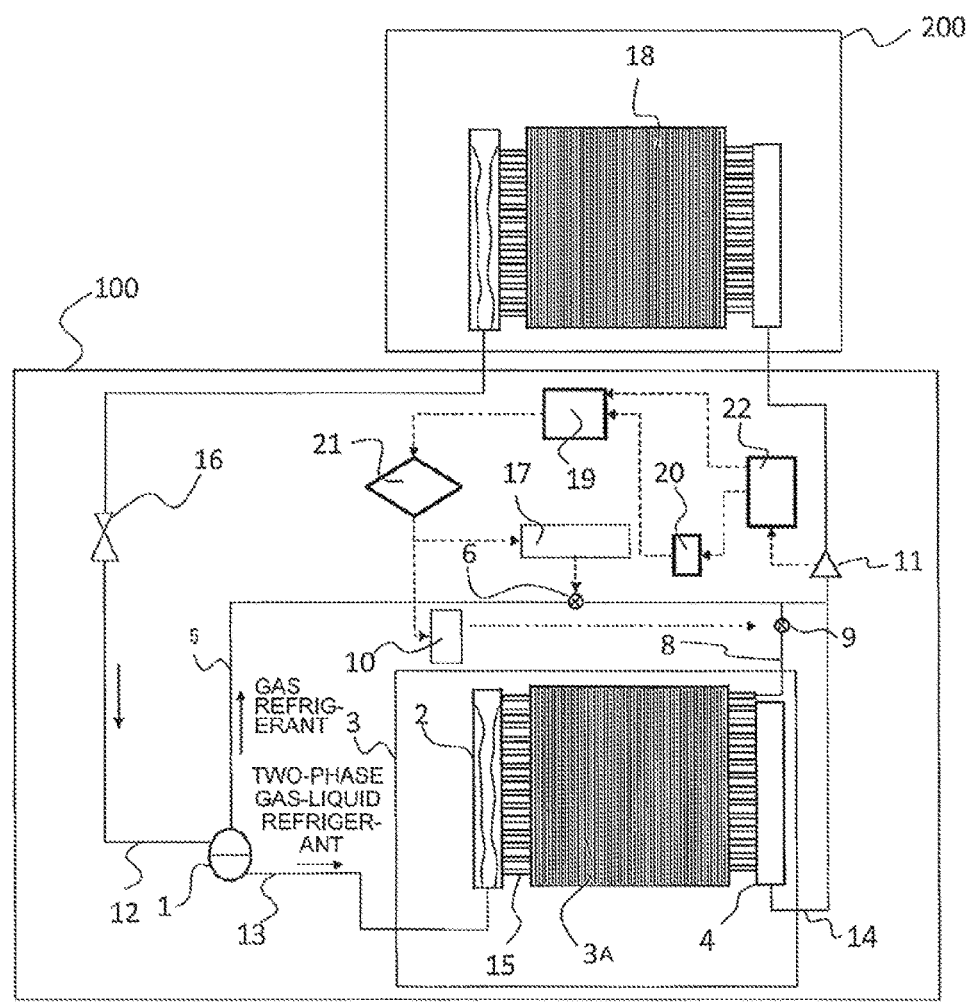
FIG. 9 illustrates the configuration of a refrigeration cycle apparatus according to Embodiment 2 of the present invention.

FIG. 9 illustrates the configuration of a refrigeration cycle apparatus according to Embodiment 2 of the present invention. In FIG. 9, units, devices, or other components referred by the same reference signs as those in FIG. 1 perform operations similar to those described in Embodiment 1.

In a refrigeration cycle apparatus according to Embodiment 2, some of the heat transfer tubes 15 located in the upper part of the header are constructed to serve as part of the header bypass pipe 8, so that the header bypass pipe 8 passes through the heat exchange unit 3A of the outdoor heat exchanger 3. For example, if a suction flow is generated within the inlet header 2, this may cause liquid refrigerant to pass through the header bypass pipe 8. Liquid refrigerant passing through the header bypass pipe 8 does not contribute to heat exchange.

Accordingly, the outdoor unit 100 refrigeration cycle apparatus) is constructed such that the header bypass pipe 8 passes through the heat exchange unit 3A. As a result, the liquid refrigerant present in the two-phase gas-liquid refrigerant sucked in the upper part of the inlet header 2 is also allowed to exchange heat in the outdoor heat exchanger 3 without being wasted. This makes it possible to prevent a decrease in the amount of heat exchange in the heat exchanger caused by suction of liquid refrigerant by the bypass in the upper part of the header.

For a suction flow to be produced in the upper part of the header, the flow resistance in the header bypass pipe 8 needs to be made lower than the flow resistance in the suction-side pipe 14. For this reason, the heat transfer tubes to be used as the header bypass pipe 8 are heat transfer tubes with an inside diameter (equivalent diameter) larger than that of the other heat transfer tubes 15. In another exemplary arrangement, smooth tubes with no grooves may be used as the heat transfer tubes that serve as the header bypass pipe 8. For example, different types of tubes may be used such that the heat transfer tubes serving as the header bypass pipe 8 are formed as circular tubes, and the heat transfer tubes 15 that do not serve as the header bypass pipe 8 are formed as flat tubes.

If the force of the suction flow is not sufficient for causing liquid refrigerant to reach the uppermost end of the inlet header 2, the flow resistance of the pipe path from the outlet header 4 to a merging portion with the header bypass pipe 8 is increased by placing a flow resistor such as a capillary tube in the suction-side pipe 14, reducing the inside diameter of the outlet header 4, or other methods to facilitate flow of liquid refrigerant to the header bypass pipe 8.

In the same manner as described above in Embodiment 1 with reference to FIGS. 3 and 4, the refrigeration cycle apparatus according to Embodiment 2 also controls the respective opening degrees of the gas-liquid-separator-side flow control valve 6 and the header-side flow control valve 9 to thus enable improved distribution under a wide range of operating conditions.

Embodiment 3

Figure 10:
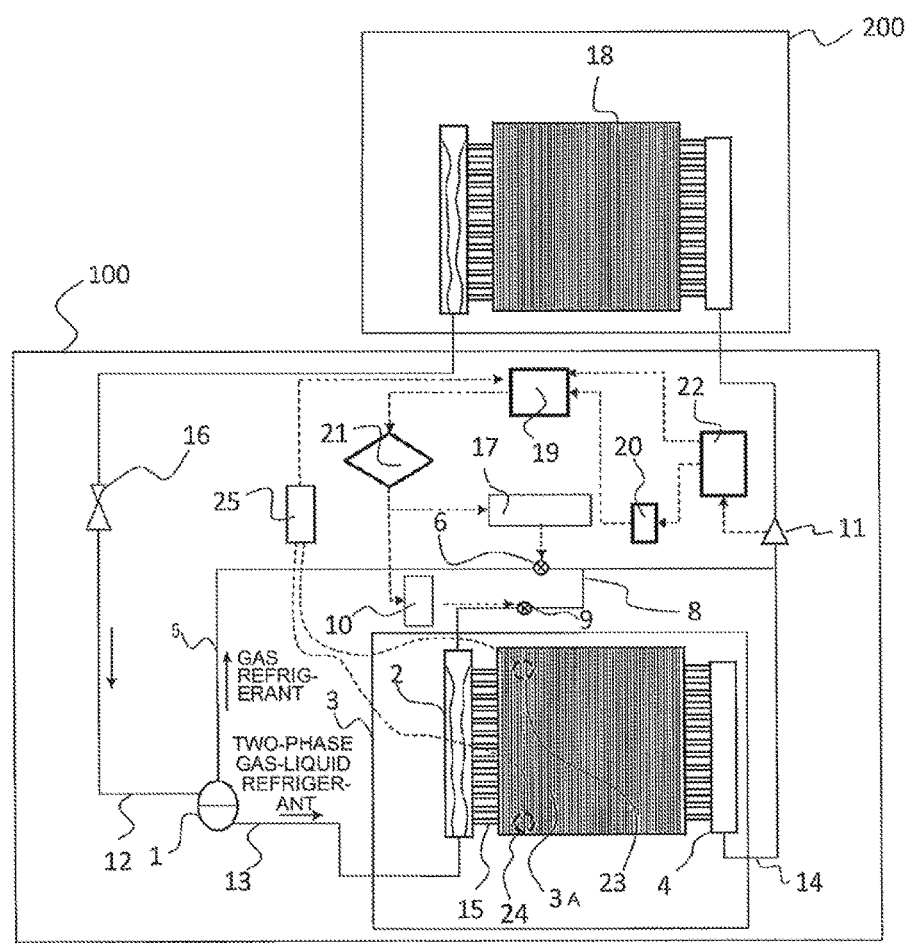
FIG. 10 illustrates the configuration of a refrigeration cycle apparatus according to Embodiment 3 of the present invention.
Figure 11:
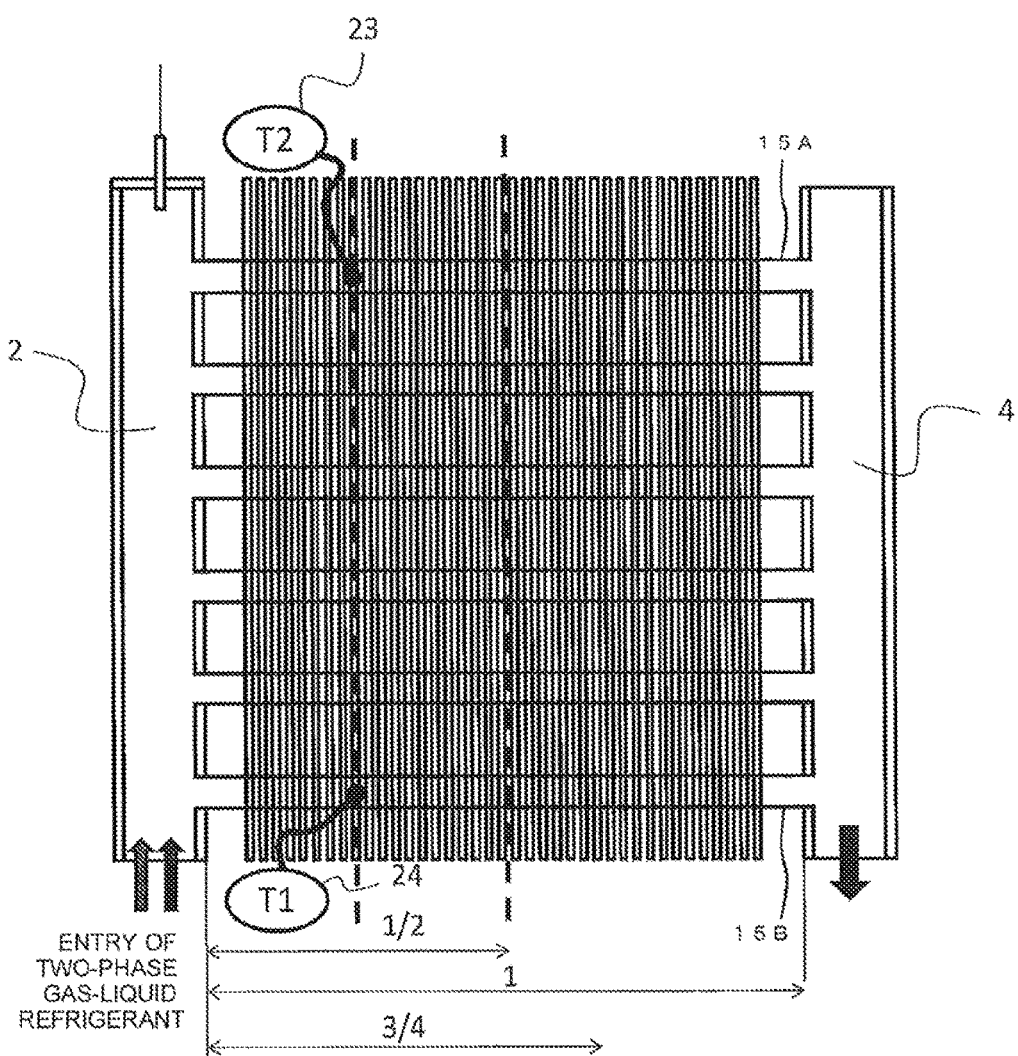
FIG. 11 is a schematic diagram of an outdoor heat exchanger 3 according to Embodiment 3 of the present invention.

FIG. 10 illustrates the configuration of a refrigeration cycle apparatus according to Embodiment 3 of the present invention. FIG. 11 is a schematic diagram of the outdoor heat exchanger 3 according to Embodiment 3 of the present invention. In Embodiment 3, an upper-side temperature sensor 23 and a lower-side temperature sensor 24, which act as temperature detecting devices, are respectively attached to at least the upper and lower parts of the outdoor heat exchanger 3. To detect temperature by each of the upper-side temperature sensor 23 and the lower-side temperature sensor 24, a thermocouple, a platinum resistance thermometer sensor, or other devices are used. However, the sensors used are not limited to these devices. Now, the locations where the upper-side temperature sensor 23 and the lower-side temperature sensor 24 are attached will be described. As illustrated in FIG. 11, Embodiment 3 includes the lower-side temperature sensor 24 and the upper-side temperature sensor 23 respectively placed at the lower and upper sides of the outdoor heat exchanger 3. The lower-side temperature sensor 24 and the upper-side temperature sensor 23 each detect the temperature of refrigerant at the location where the sensor is placed. Now, let T1 represent the temperature detected by the lower-side temperature sensor 24, and T2 represent the temperature detected by the upper-side temperature sensor 23. A temperature reader 25 reads the temperatures detected by the upper-side temperature sensor 3 and the lower-side temperature sensor 24, and stores the read temperatures into the memory data. The memory 19 stores at least the latest detection temperatures T1 and T2.

In Embodiment 3, with the length from the inlet header 2 to the outlet header 4 taken as 1, the lower-side temperature sensor 24 and the upper-side temperature sensor 23 are each placed at such a location where its distance from the inlet header 2 is equal to or less than ¾ (more preferably, equal to or less than ½). Placing each of the lower-side temperature sensor 24 and the upper-side temperature sensor 23 at the location defined in Embodiment 3 makes it possible to control the opening degrees of the header-side flow control valve 9 of the header bypass pipe 8 to be more suited for improving distribution. In this regard, for example, the lower-side temperature sensor 24 may be placed on any given heat transfer tube 15 (lower heat transfer tube 15B) located below the heat transfer tube 15 (upper heat transfer tube 15A) on which the upper-side temperature sensor 23 is placed. However, although not limiting in any way, if, for example, the upper-side temperature sensor 23 is placed on the uppermost heat transfer tube 15, and the lower-side temperature sensor 24 is placed on the lowermost heat transfer tube 15, this allows for more optimum control of valve opening degree.

Figure 12:
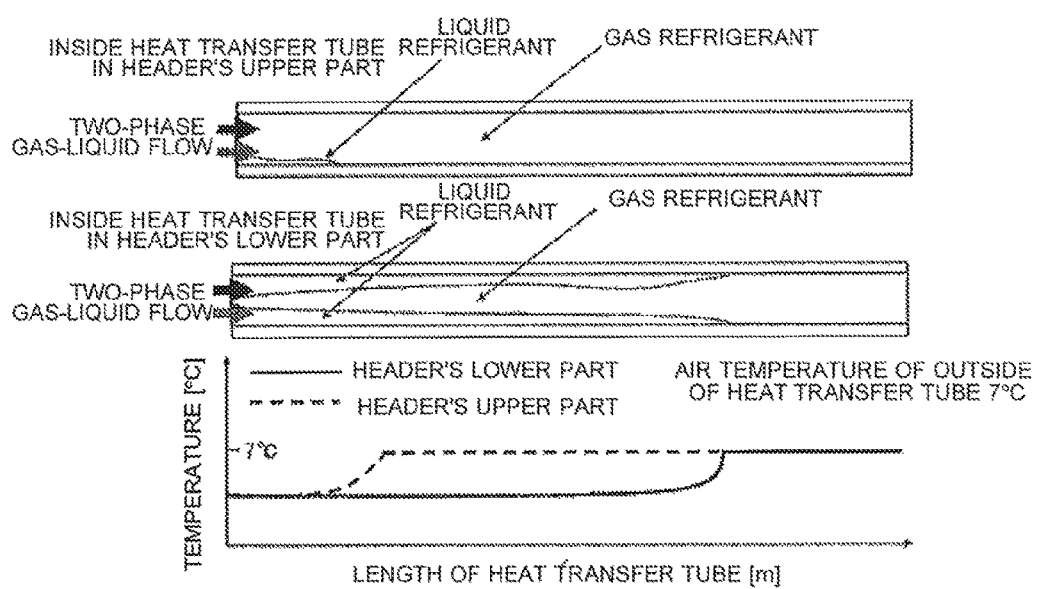
FIG. 12 illustrates the relationship between refrigerant and temperature within the heat transfer tubes 15 according to Embodiment 3 of the present invention.

FIG. 12 illustrates the relationship between refrigerant and temperature within the heat transfer tubes 15 according to Embodiment 3 of the present invention. For the heat transfer tubes 15 through which two-phase gas-liquid refrigerant, the greater the amount of liquid refrigerant flowing through the heat transfer tubes 15, the longer the distance it takes for refrigerant to reach a temperature close to the temperature of air, as the temperature of the refrigerant increased. If the momentum of refrigerant at the inlet of the inlet header 2 is small, and there is not much flow of liquid refrigerant to the upper part of the header, then the temperature of the heat transfer tubes 15 approaches the temperature of air with a relatively short distance (approximately 112 with the total length taken as 1). Thus, if T2>T1, it can be determined that there is not a sufficient flow of liquid refrigerant to the upper part of the header. By contrast, if T2 and T1 are substantially equal, then it can be determined that there is a sufficient flow of liquid refrigerant to the upper part of the header. This relationship can be exploited to control the gas-liquid-separator-side flow control valve 6 and the header-side flow control valve 9 so that liquid refrigerant reaches the upper part of the inlet header 2.

Figure 13:
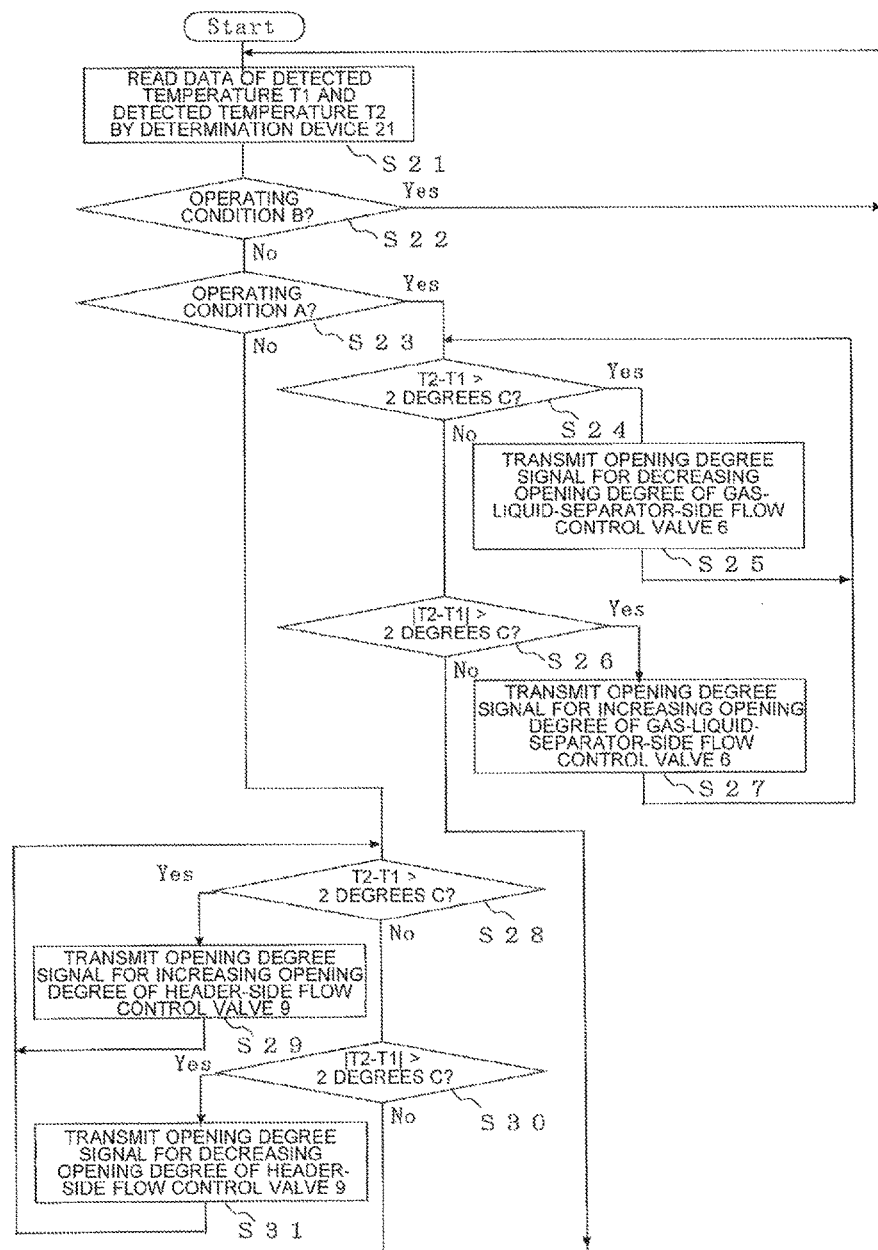
FIG. 13 is a flowchart illustrating how the gas-liquid-separator-side flow control valve 6 and the header-side flow control valve 9 are controlled according to Embodiment 3 of the present invention.

FIG. 13 is a flowchart illustrating how the gas-liquid-separator-side flow control valve 6 and the header-side flow control valve 9 are controlled according to Embodiment 3 of the present invention. The determination device 21 performs the process illustrated in FIG. 13 in response to changes in operating condition. The procedure up to the determination of the operating condition by the determination device 21 is performed in the same manner as described above with reference to Embodiment 1.

Now, if the current operating condition is determined to be Operating Condition A, the gas-liquid-separator-side flow control valve 6 is fully opened, and the header-side flow control valve 9 is fully closed. If the current operating condition is determined to be Operating Condition B, the gas-liquid-separator-side flow control valve 6 and the header-side flow control valve 9 are fully closed. If the current operating condition is determined to be Operating Condition C, the gas-liquid-separator-side flow control valve 6 is fully closed, and the header-side flow control valve 9 is fully opened.

Then, the determination device 21 reads, from the memory 19, the data of the detection temperature T2 detected by the upper-side temperature sensor 23 and the detection temperature T1 detected by the lower-side temperature sensor 24 (S21).

The determination device 21 determines whether the current operating condition is Operating Condition B (S22). If the current operating condition is, determined to be Operating Condition B, there is no need to change the gas-liquid-separator-side flow control valve 6 and the header-side flow control valve 9, and thus the processing returns to S21. If it is determined that the current operating condition is not Operating Condition B, it is then determined whether the current operating condition is Operating Condition A (S23).

If the determination device 21 determines that the current operating condition is Operating Condition A, the determination device 21 determines whether the detection temperature T1 and the detection temperature T2 satisfy the following inequality: T2−T1>2 degrees C. (S24). This inequality indicates that the temperature of the upper heat transfer tube 15A in the outdoor heat exchanger 3 exceeds the temperature of the lower heat transfer tube 15B by more than two degrees C. The comparatively higher temperature of the upper heat transfer tubes 15A indicates a low flow rate of liquid refrigerant through the upper heat transfer tube 15A. This means that a large amount of liquid refrigerant needs to be supplied to the upper heat transfer tubes 15A. Accordingly, if the determination device 21 determines that the inequality is satisfied, the determination device 21 transmits, to the flow-control-valve-opening-degree controller 17, an opening degree signal indicating that the opening degree of the gas-liquid-separator-side flow control valve 6 is to be reduced (S25), and the processing returns to S24.

If the determination device 21 determines in S24 that the inequality is not satisfied, the determination device 21 determines whether the following inequality is satisfied: |T2−T1|>2 degrees C. (−2 degrees C.<T2−T1) (S26). This determination is performed to prevent liquid refrigerant from ceasing to flow to the lower heat transfer tube 15B owing to low opening degree of the gas-liquid-separator-side flow control valve 6. Accordingly, if the determination device 21 determines that the inequality |T2−T1|>2 degrees C. is satisfied, the determination device 21 transmits, to the flow-control-valve-opening-degree controller 17, an opening degree signal indicating that the opening degree of the gas-liquid-separator-side flow control valve 6 is to be increased (S27), and the processing returns to S24. If the determination device 21 determines that the inequality |T2−T1|>2 degrees C. is not satisfied, the processing returns to S21. Therefore, under Operating Condition A, the opening degree of the gas-liquid-separator-side flow control valve 6 is controlled to satisfy the relationship −2 degrees C.≤T2−T1≤2 degrees C.

If the determination device 21 determines in S22 that the current operating condition is not Operating Condition A (the current operating condition is Operating Condition C), the determination device 21 determines whether the detection temperature T1 and the detection temperature T2 satisfy the following inequality: T2−T1>2 degrees C. (S28). As described above, this inequality indicates that the temperature of the upper heat transfer tube 15A in the outdoor heat exchanger 3 exceeds the temperature of the lower heat transfer tube 15B by more than two degrees C. This inequality also indicates a low flow rate of liquid refrigerant through the upper heat transfer tube 15A. Accordingly, if the determination device 21 determines that the inequality is satisfied, the determination device 21 transmits, to the flow-control-valve-opening-degree controller 10, an opening degree signal indicating that the opening degree of the header-side flow control valve 9 is to be increased (S29), and the processing returns to S28.

If the determination device 21 determines in S28 that the inequality is not satisfied, the determination device 21 determines whether the following inequality is satisfied: |T2−T1|>2 degrees C. (S30). This determination is performed to prevent liquid refrigerant from ceasing to flow to the lower heat transfer tube 15B because the opening degree of the header-side flow control valve 9 is high and thus a large amount of liquid refrigerant flows to the upper heat transfer tube 15A. Accordingly, if the determination device 21 determines that the inequality |T2−T1|>2 degrees C. is satisfied, the determination device 21 transmits, to the flow-control-valve-opening-degree controller 10, an opening degree signal indicating that the opening degree of the header-side flow control valve 9 is to be reduced (S31), and the processing returns to S28. If the determination device 21 determines that the inequality |T2−T1|>2 degrees C. is not satisfied, the processing returns to S21. Therefore, under Operating Condition C, the opening degree of the header-side flow control valve 9 is controlled to satisfy the relationship −2 degrees C.≤T2−T1≤2 degrees C.

Embodiment 4

Figure 14:
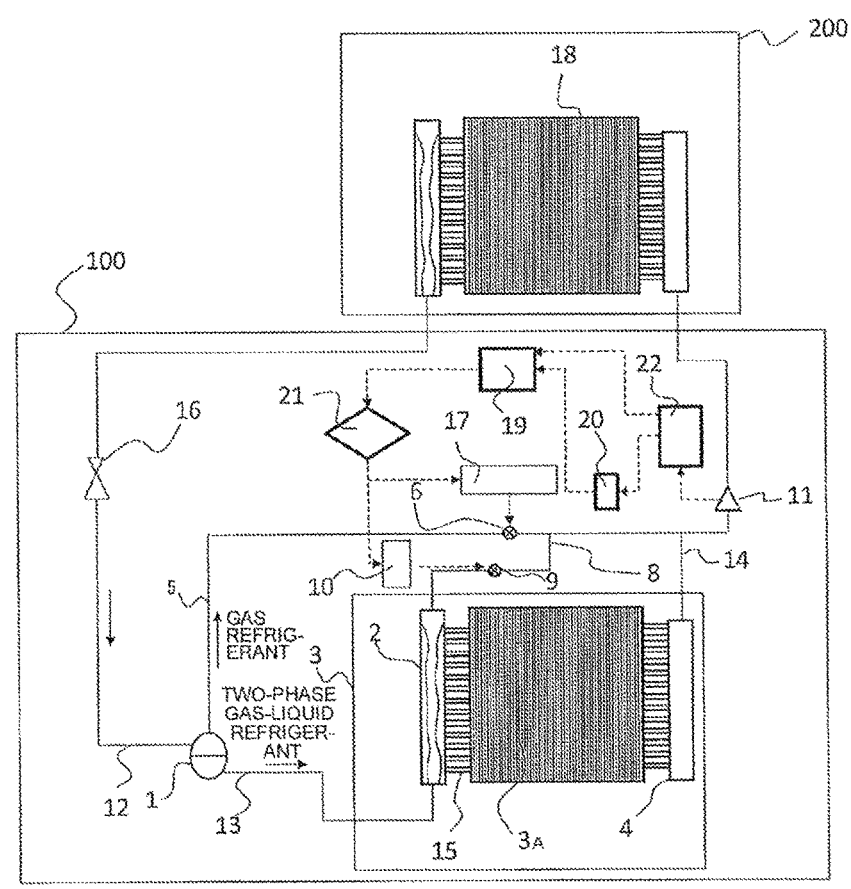
FIG. 14 illustrates the configuration of a refrigeration cycle apparatus according to Embodiment 4 of the present invention.

FIG. 14 illustrates the configuration of a refrigeration cycle apparatus according to Embodiment 4 of the present invention. In FIG. 14, units, devices, or other components referred by the same reference signs as those in FIG. 1 perform operations or other processes similar to those described in Embodiment 1. As illustrated in FIG. 14, in the refrigeration cycle apparatus according to Embodiment 4, the outdoor heat exchanger 3 is placed such that the refrigerant outlet of the outlet header 4 is positioned higher than the refrigerant inlet of the inlet header 2. Positioning the refrigerant outlet of the outlet header 4 higher than the refrigerant inlet of the inlet header 2 facilitates upward flow of liquid refrigerant. In this regard, the higher the refrigerant outlet of the outlet header 4 is located in the vertical direction (height direction) than the refrigerant inlet of the inlet header 2, the more desirable as this facilitates upward flow of liquid refrigerant.

Figure 15:
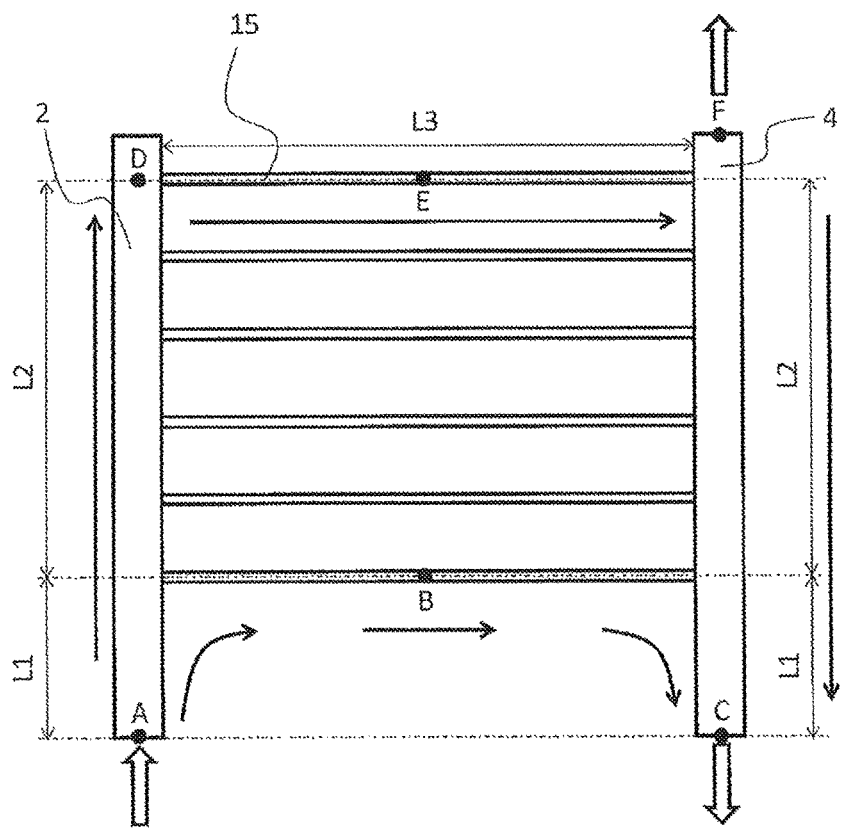
FIG. 15 is a schematic diagram of the outdoor heat exchanger 3 according to Embodiment 4 of the present invention.

FIG. 15 is a schematic diagram of the outdoor heat exchanger 3 according to Embodiment 4 of the present invention. FIG. 15 depicts the inlet header 2, the outlet header 4, and the heat transfer tubes 15 connected to both headers. Now, let L1 represent the distance (height) from the lower end of each of the inlet header 2 and the outlet header 4 to the lowermost heat transfer tube 15. Further, let L2 represent the distance (height) from the lowermost heat transfer tube 15 to the uppermost heat transfer tube 15. Then, let L3 represent the length of the heat transfer tubes 15. In this case, L2>L1.

If the liquid refrigerant does not each the upper part of the inlet header 2, a large amount of liquid refrigerant flows through the lowermost pass B of the heat transfer tubes 15. At this time, if the refrigerant outlet is located at the lower end of the outlet header 4, refrigerant passes through the lowermost pass B along the following path: A→B→C. The channel length at this time is given as L1+L3+L1. By contrast, if the refrigerant outlet is located at the upper end of the outlet header 4, refrigerant passes through the lowermost pass B along the following path: A→B→F. The channel length at this time is given as about L1+L3+L2. Thus, when the refrigerant outlet is located at the upper end of the outlet header 4, the refrigerant channel length is greater. This leads to increased flow resistance, causing liquid refrigerant to flow less easily. This leads to increased distribution toward the heat transfer tubes 15 located at higher positions, thus achieving improved distribution.

Embodiment 5

Figure 16:
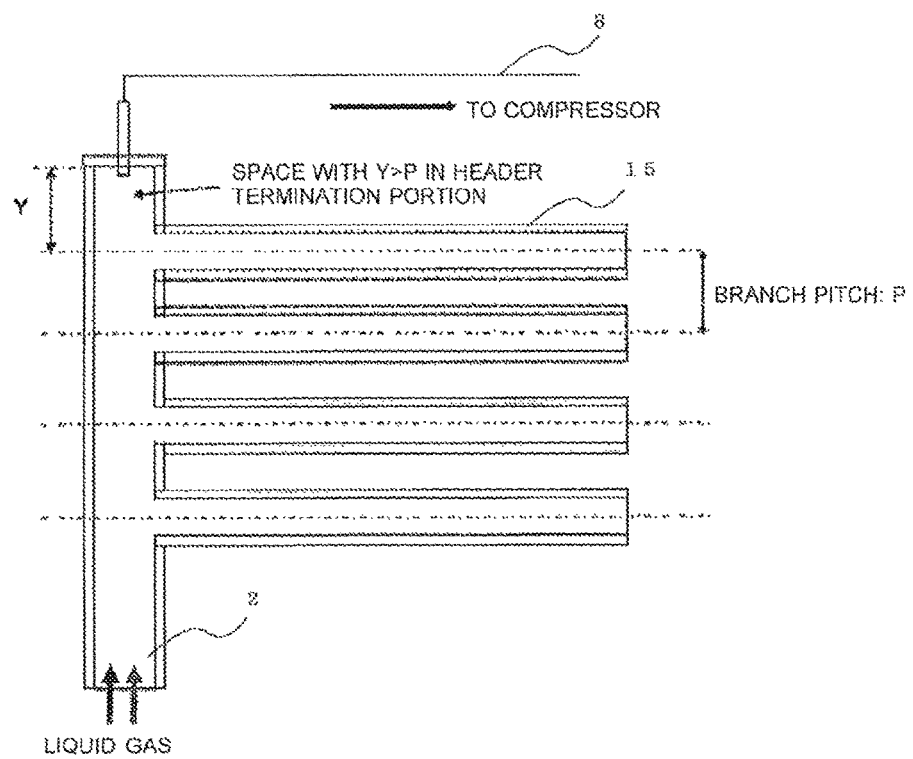
FIG. 16 illustrates the relationship between the inlet header 2 and a header bypass pipe 8 according to Embodiment 5 of the present invention.

FIG. 16 illustrates the relationship between the inlet header 2 and the header bypass pipe 8 according to Embodiment 5 of the present invention. In FIG. 16, a space whose height is, longer than the pitch P between the heat transfer tubes 15 is provided in the termination portion of the inlet header 2 (the portion of the inlet header 2 being positioned higher than the uppermost heat transfer tube 15), and this space is connected with the header bypass pipe 8 at the uppermost end of the inlet header 2. Providing a space longer than the pitch P of the heat transfer tubes 15 in this way causes two-phase gas-liquid refrigerant to separate into gas and liquid in this space. As a result, gas refrigerant passes through the header bypass pipe 8, thus preventing liquid refrigerant from entering the header bypass pipe 8.

Figure 17:
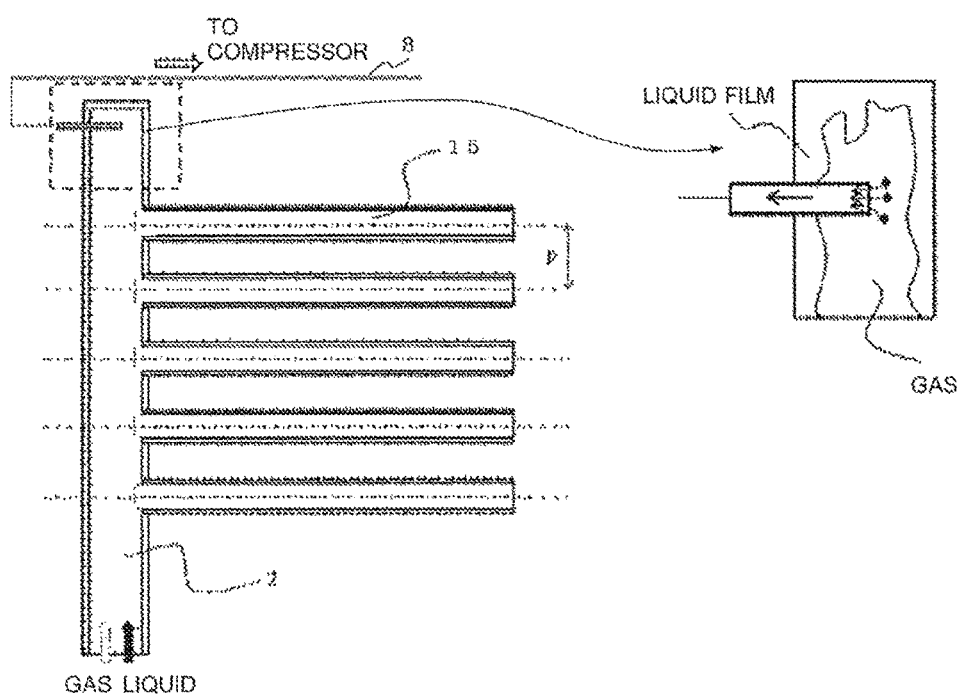
FIG. 17 illustrates another example of the relationship between the inlet header 2 and the header bypass pipe 8 according to Embodiment 5 of the present invention.

FIG. 17 illustrates another example of the relationship between the inlet header 2 and the header bypass pipe 8 according to Embodiment 5 of the present invention. In FIG. 17, the header bypass pipe 8 is inserted into the termination portion of the inlet header 2 such that the header bypass pipe 8 protrudes to the space inward of the inner wall face of the inlet header 2. This configuration, which exploits the characteristic that liquid refrigerant tends to flow along the side wall of a pipe, ensures that the opening portion of the header bypass pipe 8 is positioned at a location where liquid refrigerant does not readily flow. At this time, it is more preferable that the header bypass pipe 8 protrudes to the center of the inside diameter of the inlet header 2, as this ensures that the header bypass pipe 8 opens at the location where liquid refrigerant is least likely to flow.

Embodiment 6

Figure 18:
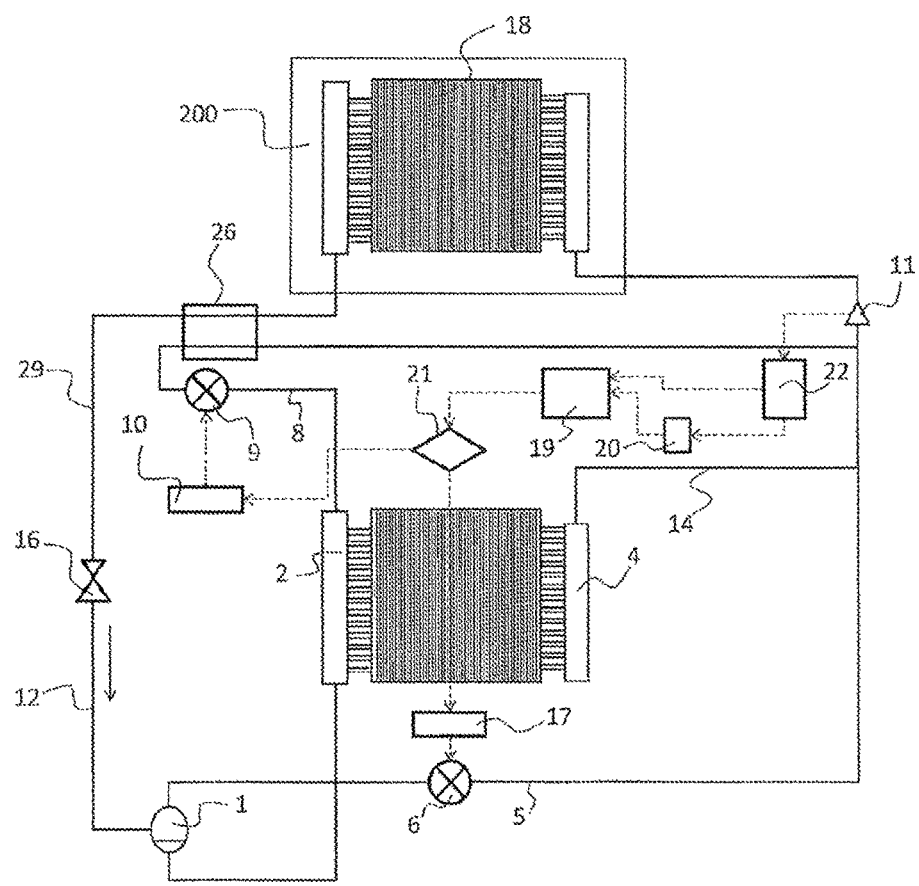
FIG. 18 illustrates the configuration of a refrigeration cycle apparatus according to Embodiment 6 of the present invention.

FIG. 18 illustrates the configuration of a refrigeration cycle apparatus according to Embodiment 6 of the present invention. In FIG. 18, units, devices, or other components referred by the same reference signs as those in FIG. 1 perform operations or other processes similar to those described in Embodiment 1. As illustrated in FIG. 18, the refrigeration cycle apparatus according to Embodiment 6 is characterized by including an internal heat exchanger 26. The internal heat exchanger 26 causes heat to be exchanged between the refrigerant flowing through a pipe (load-unit-downstream-side pipe 29) that connects the load unit 200 (the load heat exchanger 18) with the expansion valve 16, and the refrigerant at low pressure flowing through the header bypass pipe 8.

The presence of the internal heat exchanger 26 ensures that even when liquid refrigerant mixes into the header bypass pipe 8, the heat exchange energy possessed by the refrigerant can be recovered by the refrigerant flowing through the load-unit-downstream-side pipe 29. This makes it possible to prevent the amount of heat exchange in the outdoor unit 100 from decreasing. Further, the refrigerant flowing through the load-unit-downstream-side pipe 29 can be cooled in the internal heat exchanger 26. As a result, the amount of gas refrigerant present in the refrigerant entering the gas-liquid separator 1 can be reduced, thus allowing for reduced container size of the gas-liquid separator 1.

Embodiment 7

Figure 19:
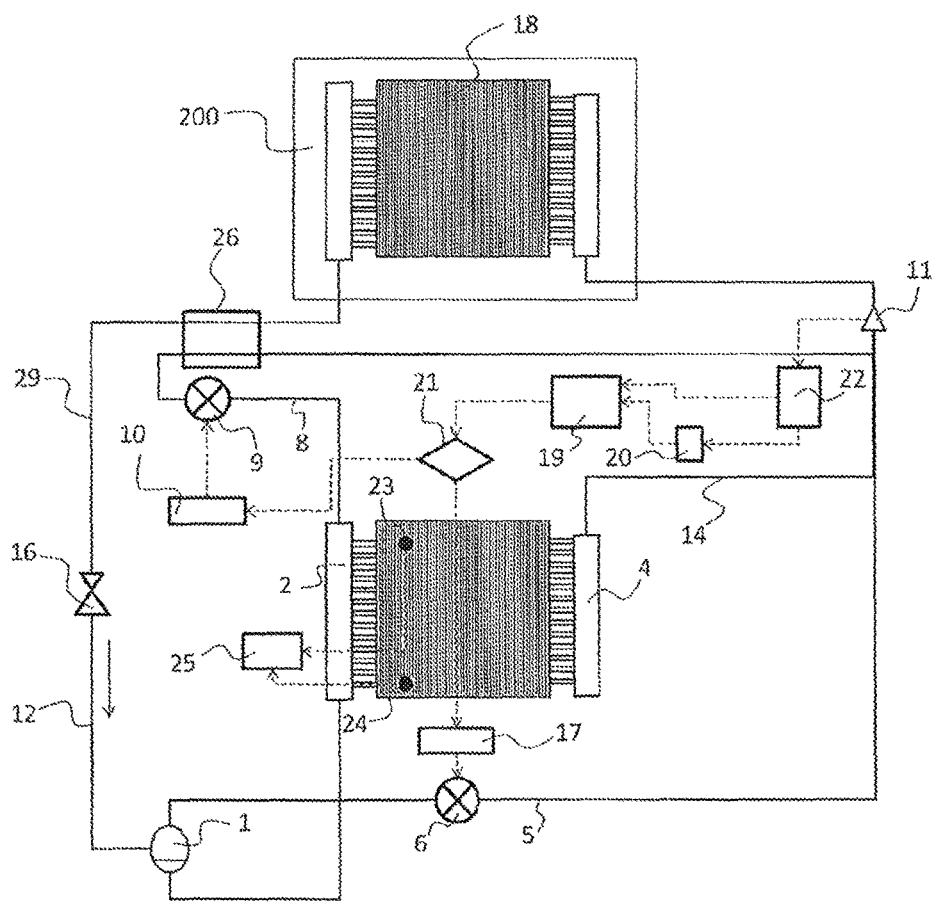
FIG. 19 illustrates the configuration of a refrigeration cycle apparatus according to Embodiment 7 of the present invention.

FIG. 19 illustrates the configuration of a refrigeration cycle apparatus according to Embodiment 7 of the present invention. In FIG. 19, units, devices, or other components referred by the same reference signs as those in FIG. 1 perform operations or other processes similar to those described in Embodiment 1. As illustrated in FIG. 19, in the refrigeration cycle apparatus according to Embodiment 7, the upper-side temperature sensor 23 and the lower-side temperature sensor 24, which act as temperature detecting devices, are respectively attached to at least the upper and lower parts of the outdoor heat exchanger 3 according to Embodiment 6 described above. The locations where the upper-side temperature sensor 23 and the lower-side temperature sensor 24 are attached, the material of the temperature sensors, or other features are the same as those described in Embodiment 3. Further, the method of controlling the gas-liquid-separator-side flow control valve 6 and the header-side flow control valve 9 based on the temperatures detected by the upper-side temperature sensor 23 and the lower-side temperature sensor 24 is also the same as that described above with reference to Embodiment 3.

INDUSTRIAL APPLICABILITY

Although not particularly specified in Embodiments 1 to 5 mentioned above, the refrigeration cycle apparatus according to the present invention is applicable to, for example, a heat pump apparatus, such as a hot-water supply apparatus, a cooling apparatus, or other apparatuses.

REFERENCE SIGNS LIST 1 gas-liquid separator 2 inlet header 3 outdoor heat exchanger 3A heat exchange unit 4 outlet header 5 gas-liquid-separator bypass pipe 6 gas-liquid-separator-side flow control valve 8 header bypass pipe 9 header-side flow control valve 10 flow-control-valve-opening-degree controller 11 compressor 13 two-phase refrigerant pipe 14 suction-side pipe 15 heat transfer tube 15A upper heat transfer tube 15B lower heat transfer tube 16 expansion valve 17 flow-control-valve-opening-degree controller 18 load heat exchanger 19 memory 20 compressor frequency reader 21 determination device 22 control board 23 upper-side temperature sensor 24 lower-side temperature sensor 25 temperature reader 26 internal heat exchanger 29 load-unit-downstream-side pipe 100 outdoor unit 200 load unit

The invention claimed is:

1. An outdoor unit for a refrigerant circuit, the refrigerant circuit being formed by connecting, by pipes, a compressor, a condenser that causes refrigerant to reject heat to condense, a pressure reducing device that reduces a pressure of the refrigerant that is condensed, a gas-liquid separator, and an evaporator, the outdoor unit comprising:
the compressor that compresses and discharges the refrigerant sucked into the compressor;
the gas-liquid separator that separates the refrigerant exiting the pressure reducing device into refrigerant in gaseous form and refrigerant in liquid form;
an outdoor heat exchanger serving as the evaporator including at least a plurality of heat transfer tubes that cause the refrigerant to receive heat to evaporate, and an inlet header that distributes the refrigerant entering the inlet header to the plurality of heat transfer tubes;
a gas-liquid-separator bypass pipe that causes the refrigerant in the gaseous form separated by the gas-liquid separator to bypass the evaporator;
a gas-liquid-separator-side flow control valve configured to control a flow rate of the refrigerant through the gas-liquid-separator bypass pipe;
a header bypass pipe having one end connected to the inlet header at a header termination side located opposite to a refrigerant inlet side of the inlet header, the header bypass pipe sucking the refrigerant entering the inlet header;
a header-side flow control valve configured to control a flow rate of the refrigerant through the header bypass pipe; and
a determination device configured to determine, from a frequency of the compressor, an opening degree of the gas-liquid-separator-side flow control valve and an opening degree of the header-side flow control valve.

2. The outdoor unit of claim 1,
wherein with a frequency band of the compressor divided into at least three ranges to satisfy a relationship: a frequency band f1>a frequency band f2>a frequency band f3, the determination device
determines to open the gas-liquid-separator-side flow control valve and close the header-side flow control valve when the frequency of the compressor is within the frequency band f1,
determines to close the gas-liquid-separator-side flow control valve and the header-side flow control valve when the frequency of the compressor is within the frequency band f2, and
determines to close the gas-liquid-separator-side flow control valve and open the header-side flow control valve when the frequency of the compressor is within the frequency band f3.

3. The outdoor unit of claim 1,
wherein one or more of the plurality of heat transfer tubes comprise a part of the header bypass pipe.

4. The outdoor unit of claim 2, further comprising
temperature sensors attached at least to one of the plurality of heat transfer tubes located on the refrigerant inlet side of the inlet header and to one of the plurality of heat transfer tubes located on the header termination side, for detecting a temperature of each of locations at which the temperature sensors are attached,
wherein when the frequency of the compressor is within the frequency band f1,
the determination device determines
to decrease the opening degree of the gas-liquid-separator-side flow control valve when T2−T1>2 degrees C. is satisfied, and
to increase the opening degree of the gas-liquid-separator-side flow control valve when T2−T1<−2 degrees C. is satisfied, and
when the frequency of the compressor is within the frequency band f3,
the determination device determines
to increase the opening degree of the header-side flow control valve when T2−T1>2 degrees C. is satisfied, and
to decrease the opening degree of the header-side flow control valve when T2−T1<−2 degrees C. is satisfied
where T1 represents a detected temperature of the one of the plurality of heat transfer tubes located on the refrigerant inlet side, and T2 represents a detected temperature of the one of the plurality of heat transfer tubes located on the header termination side.

5. The outdoor unit of claim 1,
wherein a refrigerant outlet of an outlet header through which streams of the refrigerant passing through the plurality of heat transfer tubes are merged to exit is positioned higher than a refrigerant inlet of the inlet header.

6. The outdoor unit of claim 1,
wherein the header bypass pipe is configured to prevent the refrigerant in the liquid form from passing therethrough.

7. The outdoor unit of claim 6,
wherein a distance between one of the plurality of heat transfer tubes located most distant from the refrigerant inlet side, and a terminal end portion of the inlet header is greater than a pitch between the plurality of heat transfer tubes.

8. The outdoor unit of claim 6,
wherein the one end of the header bypass pipe is projected into the inlet header to connect with the inlet header.

9. A refrigeration cycle apparatus comprising:
the outdoor unit of claim 1; and
a load unit having a load heat exchanger,
the load heat exchanger acting as the condenser that causes the refrigerant to reject heat to condense,
the load unit being connected to the outdoor unit to form the refrigerant circuit.

10. The refrigeration cycle apparatus of claim 9, further comprising an internal heat exchanger located between a pipe that connects the load heat exchanger with the pressure reducing device, and the header bypass pipe,
wherein the internal heat exchanger causes heat to be exchanged between the refrigerant flowing from the load heat exchanger toward the pressure reducing device, and the refrigerant flowing through the header bypass pipe.

11. The refrigeration cycle apparatus of claim 9,
wherein the refrigeration cycle apparatus comprises an air-conditioning apparatus or a cooling apparatus.

12. An outdoor unit for a refrigerant circuit, the refrigerant circuit being formed by connecting, by pipes, a compressor, a condenser that causes refrigerant to reject heat to condense, a pressure reducing device that reduces a pressure of the refrigerant that is condensed, a gas-liquid separator, and an evaporator, the outdoor unit comprising:
the compressor that compresses and discharges the refrigerant sucked into the compressor;
the gas-liquid separator that separates the refrigerant exiting the pressure reducing device into refrigerant in gaseous form and refrigerant in liquid form;
an outdoor heat exchanger serving as the evaporator including at least a plurality of heat transfer tubes that cause the refrigerant to receive heat to evaporate, and an inlet header that distributes the refrigerant entering the inlet header to the plurality of heat transfer tubes;
a gas-liquid-separator bypass pipe that causes the refrigerant in the gaseous form separated by the gas-liquid separator to bypass the evaporator;
a gas-liquid-separator-side flow control valve configured to control a flow rate of the refrigerant through the gas-liquid-separator bypass pipe;
a header bypass pipe having one end connected to the inlet header at a header termination side located opposite to a refrigerant inlet side of the inlet header, the header bypass pipe sucking the refrigerant entering the inlet header;
a header-side flow control valve configured to control a flow rate of the refrigerant through the header bypass pipe, and
a flow-control-valve-opening-degree controller configured to control the gas-liquid separator-side flow control valve and the header-side flow control valve,
wherein the flow-control-valve-opening-degree controller controls an opening degree of the header-side flow control valve so that the header-side flow control valve closes under an operating condition in which a refrigerant flow rate of a refrigerant delivered from the compressor is high and the header-side flow control valve opens under an operating condition in which the refrigerant flow rate is low.

13. The outdoor unit of claim 12,
wherein the flow-control-valve-opening-degree controller controls an opening degree of the gas-liquid-separator-side flow control valve so that the gas-liquid-separator-side flow control valve opens under the operating condition in which the refrigerant flow rate is high, and the gas-liquid-separator-side flow control valve closes under the operating condition in which the refrigerant flow rate is low, or under an operating condition in which the refrigerant flow rate is intermediate between the high and low refrigerant flow rates.

\* \* \* \* \*